United States Patent [19]

Asam

[11] 4,199,337
[45] Apr. 22, 1980

[54] METHOD OF FABRICATING HIGH STRENGTH OPTICAL PREFORMS

[75] Inventor: Adolf R. Asam, Daleville, Va.

[73] Assignee: International Telephone and Telegraph Corporation, New York, N.Y.

[21] Appl. No.: 949,349

[22] Filed: Oct. 6, 1978

[51] Int. Cl.$^2$ .................... C03C 25/02; C03C 15/00
[52] U.S. Cl. ................................. 65/3 A; 65/31
[58] Field of Search .................. 65/DIG. 7, 31, 3 A

[56] References Cited

U.S. PATENT DOCUMENTS

| | | | |
|---|---|---|---|
| 3,864,111 | 2/1975 | Kemp | 65/31 |
| 3,975,175 | 8/1976 | Foster et al. | 65/31 |
| 3,982,916 | 9/1976 | Miller | 65/DIG. 7 |
| 3,982,917 | 9/1976 | Upton | 65/31 |
| 4,009,014 | 2/1977 | Black et al. | 65/DIG. 7 |
| 4,102,664 | 7/1978 | Dumbaugh, Jr. | 65/31 X |
| 4,116,653 | 9/1978 | Irven | 65/31 X |

OTHER PUBLICATIONS

Journal American Ceramic Society, by Krohn, Sep. 1970, pp. 505–504.
Journal American Ceramic Society, by Paek and Kurkjian, Aug. 1975, pp. 330–335.

*Primary Examiner*—S. Leon Bashore
*Assistant Examiner*—Frank W. Miga
*Attorney, Agent, or Firm*—John T. O'Halloran; Peter C. Van der Sluys

[57] ABSTRACT

A process is disclosed for finishing high-strength multilayer optical preforms capable of being drawn into long optical fibers useful for light-wave communications. The preforms are of the type prepared by sequential chemical-vapor-deposition of the various desired glass layers within a tubular glass substrate that is then collapsed into a solid cylindrical preform comprising a cylindrical light-transmitting core surrounded by a concentric cladding layer and one or more additional layers within the collapsed substrate. In order for the outermost deposited additional layer to constitute a thin high-compression layer on the surface of the completed optical structure, it is necessary first to remove substantially all of the substrate layer from the preform in such a manner as to leave the adjoining high-compression layer intact. This is accomplished by selecting a glass for the substrate layer that is capable of being etched away faster than the high-compression layer, and then using controlled preferential etching to remove the substrate layer without penetrating or damaging the high-compression layer.

This method makes it possible to provide a thinner and more effective outer high-compression layer, on the surface of the completed preform, which is of uniform radial thickness regardless of any nonlinearity or nonconcentricity of the core, enclosing layers, or substrate layer. An optical fiber drawn from the completed preform will then retain a uniform high-compressive stress in its outer layer that contributes materially to its tensile strength, durability, and fiber life.

3 Claims, 2 Drawing Figures

- 10 CORE LAYER
- 11 CLADDING LAYER
- 12 HIGH-COMPRESSION ION-BARRIER LAYER
- 13 VYCOR SUBSTRATE LAYER (TO BE REMOVED)

- 10 CORE LAYER
- 11 CLADDING LAYER
- 14 HIGH EXPANSION LAYER
- 12 HIGH COMPRESSION ION-BARRIER LAYER
- 13 VYCOR SUBSTRATE LAYER (TO BE REMOVED)

METHOD OF FABRICATING HIGH STRENGTH OPTICAL PREFORMS

BACKGROUND OF THE INVENTION

Multilayer drawn glass fibers are of increasing importance for the transmission of light beams over long distances, expecially for light-wave communications. To avoid excessive light losses, it is now common practice to form composite drawn fibers having a glass core of one optical index of refraction and a surrounding cladding glass layer of a lower index of refraction. Single-mode fibers may have a core diameter of only a few microns and an outer diameter of core and cladding of from 10 to 100 times greater; whereas multi-mode fibers may have much larger core diameters, e.g., longer than 60 microns, up to 100 microns, and outer cladding diameters up to about 150 microns. The cladding layer is customarily enclosed by one or more layers of a suitable plastic to provide physical protection for the delicate fiber. Even so, problems of low fiber strength, inadequate fiber durability, and short life have remained.

When a tensile force or bending stress is applied to the fiber, tension in the outer fiber surface imcreases substantially. Even when precautions are taken to keep dust particles and moisture from the outer surface of the glass fiber structure, as by immediate application of the plastic coating during manufacture, the fiber is usually somewhat abraded and micro-cracks tend to form on the fiber surface. Since an optical communication fiber may be subject to considerable tensile and bending stresses, dividing employment, such microcracks propagate readily from the perimeter of the glass surface toward the glass core. In due time the entire fiber becomes substantially weakened and may fracture after a relatively short life that is totally inadequate for communication purposes. The presence of water molecules on the glass perimeter will also enhance crack propagation, increasing the chances of early failure.

One known method of increasing the strength of glass optical communication fibers is to provide surface compression at the cladding surface. Such a technique is discussed, for example, in a article in the Journal of the American Ceramic Society, December 1969, pages 661-664, by D. A. Krohn and A. R. Cooper, then of Case Western Reserve University. This article presents theoretical and experimental data to show that, if the cladding is selected to have a lower coefficient of thermal expansion than that of the core glass and if proper attention is paid to glass transition temperatures of the core and cladding, there is a good probability that compressive stresses can be developed to improve fiber strength.

It has also been previously proposed in general terms to strengthen a composite optical fiber by applying a second sheath over the cladding sheath which has a lower coefficient of thermal expansion of the cladding sheath or of the combination of core and cladding sheath. See for example the German Federal Republic Offenlegungsschrift 24 19 786, published Nov. 6, 1975. Reference may also be made to a corresponding English version in Australian Specification No. 493,505, published Oct. 21, 1976.

In a copending application Ser. No. 949,351, filed Oct. 6, 1978 by Charles K. Kao and Mokhtar S. Maklad, assigned to the same assignee as the present invention, new and improved three-layer and four-layer composite optical preforms and fibers are disclosed. By using fabrication techniques disclosed in this application, resultant highquality optical communication fibers can be produced having much higher surface compression and higher tensile strengths than those taught by the prior art as typified by the references cited above. Briefly, this is accomplished by fabricating the multilayer preforms and resultant fibers from various glass materials having carefully-selected glass compositions, thicknesses, coefficients of expansion and glass transition temperatures, as set out in detail in the Kao et all application. By these techniques, they have found it possible to obtain compressive stresses in the outer surface of the completed fiber of 50,000 pounds per square inch (50 kpsi). or higher.

The referenced copending Kao et al. application also discloses a method of manufacturing a preform for such a composite glass fiber in which selected glassy materials, which will later form the core and surrounding layers of the fiber, are deposited by chemical vapor deposition (CVD) techniques on the inner surface of a hollow tubular substrate of a silica material. The substrate and enclosed annular layers, which have been deposited in inverse order with a core layer deposited last, are then collapsed under increased heat into a solid preform structure. These methods and techniques, as thus far described, are well known in the art with variations thereof being described in U.S. Pat. Nos. 3,982,916; 4,009,014; and U.S. application Ser. No. 704,146 filed July 12, 1976 now U.S. Pat. No. 4,140,505 issued Feb. 20, 1979. However, before this preform is reheated and drawn out into an optical fiber, also by known techniques, Kao et al. employ further processing to obtain much higher compressive stresses on its outer surface than can be produced at the surface of the relatively-thick outer layer formed from the collapsed substrate tube. They disclose two methods for removing all, or substantially all, of the substrate layer employing either precision grinding off and polishing, or milling off this layer by a highintensity $CO_2$ laser beam. This can be accomplished, as taught in their application, so as to leave a first, relatively thin material that was initially deposited in the substrate tube as the outer layer. They also teach how to make this layer a very high compression layer. From this completed preform a long optical fiber can then be drawn having greater durability, strength and fiber life than previously thought possible.

However, it is sometimes difficult, when using the above-described grinding or laser-milling techniques, to remove the substrate layer uniformly if the collapsed preform is not entirely straight or if the core and various layers are not precisely concentric. Furthermore, the desired outer layer of the completed preform and fiber must have a thickness of only a few microns to achieve the desired high compressive stress. For example, Kao et al. have determined that the radial thickness of the outer high-compression layer in the completed structure should be less than 10 microns, and preferably in the range of 1 to 5 microns. I have discovered how to remove the unwanted substrate material with even greater precision than previously attained, regardless of nonlinearity or lack of concentricity in the collapsed preform, by using a novel combination of materials and processing techniques to be described below.

SUMMARY OF THE INVENTION

Briefly, in accordance with my invention the unwanted substrate material on the outer surface of the collapsed preform, prepared by the internal CVD and heating techniques described in the Kao et al. application, is removed by employing two novel techniques: (1) the initial tubular substrate is made of a slightly-different glass than that of the first thin deposited layer that is to form the outer high-compression layer in the finished preform and fiber, and (2) preferential etching is used to remove the substrate layer without damaging the adjacent high-compression layer.

Other features and objects of my invention will become apparent from the detailed description of the invention set out below.

DETAILED DESCRIPTION OF THE INVENTION

Figure 1:
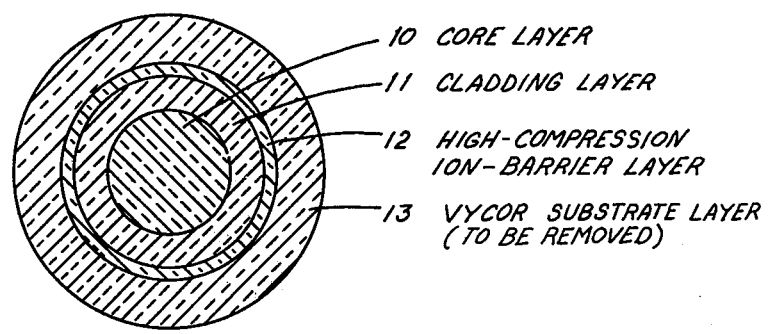
FIG. 1 is a cross-section view of a partially-completed optical preform, not necessarily to scale, which will become a finished three-layer preform after its surrounding substrate layer is removed in accordance with the principles of my invention.

The partially-completed preform structure of FIG. 1 may be prepared by the inside CVD process, followed by collapse into the illustrated solid cylindrical structure, as set out in detail in the referenced copending application of Kao et al. As illustrated in FIG. 1, the optical transmission structure comprises the collapsed cylindrical core layer 10 and its surrounding cladding layer 11. These may be selected for optimum light transmission characteristics and, as previously mentioned, the cladding glass is selected to have a lower index of refraction than the core glass.

As is further taught in the Kao et al. application, the cladding layer 11 in FIG. 1 is surrounded by a much thinner layer 12 which was the first glassy material to have been deposited within the outer tubular substrate that is now the layer 13. For production and cost reasons, the substrate layer may be of a lower quality of glass material than the glass material of layer 12; hence layer 12 also functions as an ion-barrier layer to reduce the diffusion of impurities from layer 13 into cladding layer 11 during the formation process. However, the primary function of layer 12 is to form the thin high-compression outer layer in the completed preform and resultant fiber, after the substrate layer 13 is removed in accordance with my invention.

In order to produce a high degree of compression in the resultant outer layer 12, Kao et al employ glass materials for the layers 10, 11 and 12 that are specially-formulated for optimum coefficients of thermal expansion and glass transition temperatures. The glass transition temperature or setting temperature $T_g$, as it is commonly called in the art, is that temperature at which a molten glass changes from a viscous state to an elastic state as it cools down; often more exactly defined as that temperature at which the viscosity of the cooling molten glass reaches $10^{13}$ poises. By way of example, Kao et al. may employ a germania-doped silicate glass for core 10, a boron-doped silicate glass for cladding layer 11, and substantially pure fused silica layer 12. The core and cladding glasses have relatively high coefficients of thermal expansion and relatively low glass transition temperatures as compared to the relatively low coefficient of thermal expansion and the relatively high glass transition temperature of the thin silica layer 12, thereby resulting in the desired high compressive stress in the outer surface of the finished preform. However, if the relatively thick substrate layer 13 were not first removed, an optical fiber drawn directly from the structure shown in FIG. 1 would have undesirably low surface compression and poor tensile strength.

For maximum compressive stress in the outer layer 12 in a completed preform or fiber, the substrate layer 13 should be removed as nearly completely as possible and the layer 12 should have a uniform finished radial thickness in the range of 1 to 10 microns, peferably no more than 5 microns and better yet 2 to 3 microns, in the finished fiber. When the substrate layer 13 is physically removed by grinding or laser-milling techniques, Kao et al. have found it difficult to achieve such optimum thinness of layer 12 if there is any slight nonlinearity in the collapsed preform or any nonconcentricity in the core or surrounding layers. If not perfectly straight and concentric, it is likely that some of the substrate layer 13 will be left or that some portions of the thin layer 12 will be cut away, thereby adversely affecting the magnitude and uniformity of the desired compressive stresses in the outer surface. In any event, an optimum uniform radial thickness of 2 to 3 microns in the outer layer 12 of a finished fiber has heretofore been very difficult to achieve.

As will now be described in detail, my improved preform finishing process is not affected by any nonlinearity in the structure of FIG. 1 nor by any lack of concentricity in its core or surrounding layers. Therefore, layer 12 in the finished fiber may be made much thinner than heretofore considered possible, e.g., 2 to 3 microns in radial thickness.

The referenced Kao et al. application teaches that the layer 12 should be of substantially the same glass composition as the substrate layer, i.e., of undoped silica but preferably of higher purity. Hence, when these two layers are fused together they function essentially as a single layer insofar as the physical grinding or milling steps are concerned. In accordance with my invention, a much finer control of the substrate removal step can be achieved by utilizing slightly different glass compositions for the layers 12 and 13 having dissimilar etching rates when the structure of FIG. 1 is immersed in a commercial glass etchant such as a hydrofluoric acid solution. Specifically, I may also use a substantially pure silica for the deposited high-compression layer 12, but I employ a substrate tube of a doped silica material having a substantially higher etching rate. In particular, I have found the silicate glass known commercially to the industry by the registered trademark "VYOOR" to be well-suited for this purpose. This glass composition, which is widely used in the glass industry, is available from the Corning Glass Works, Corning, N.Y., and is a sodium-borosilicate glass composed of 96 to 97% silica with a 3 to 4% mixture of boron oxide and sodium oxide, e.g., 1 to 2% of boron oxide and the balance sodium oxide. It is well-known that this sodium-borosilicate glass is slightly softer than pure silica glass and that it has an etching rate in hydrofluoric acid that is approximately three times that for pure silica glass. Etching rates can of course be increased or decreased to some extent by altering the concentration and temperature of the etchant. Also, other glasses similar to VYCOR can be formulated by introducing suitable modifiers to enhance the preferential etching rate with respect to silica glasses.

An important feature of my invention is therefore the selection of VYCOR or an equivalent glass suitable for use as a substrate and having a higher etching rate than pure silica glass or other glass suitable for the thin high-compression layer. Such is the relationship of the substrate layer 13 and the high-compression layer 12, respectively, in the partially-completed preform of FIG. 1.

Figure 2:
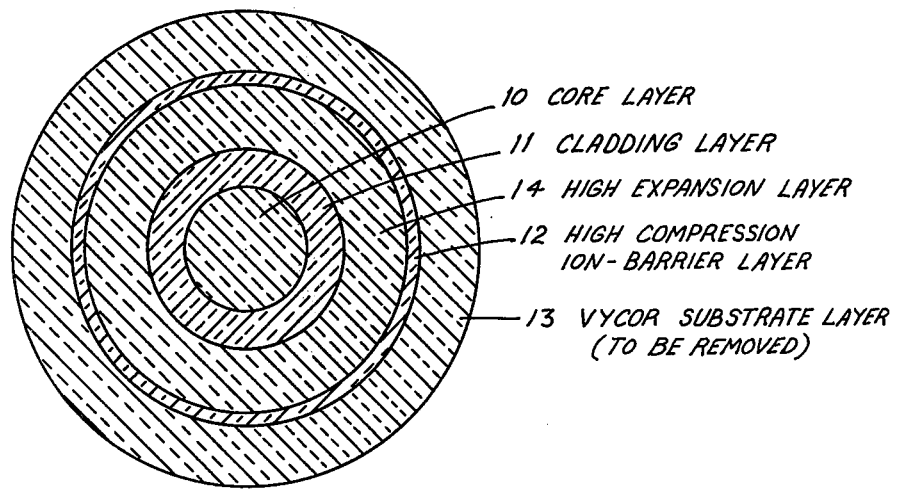
FIG. 2 is a similar cross-section view of another partially-completed preform, likewise not necessarily to scale, which will become a finished four-layer preform after its surrounding substrate is removed in like manner.

FIG. 2 illustrates another partially-completed preform which may also be prepared by the inside CVD process, followed by collapse into the illustrated solid cylindrical structure. As set out in the copending Kao et al. application, it differs from the structure of FIG. 1 in that it includes an additional high-expansion glass layer 14 between the cladding layer 11 and the high-compression layer 12. The glass of layer 14, like the core and cladding layers, has a higher coefficient of thermal expansion and a lower glass transition temperature than those of layer 12. Layer 14, though not necessarily shown to scale in FIG. 2, is preferably considerably thicker than the cladding layer 11. Consequently, the surface area per unit length enclosed by the high-compression layer 12 in the finished four-layer fiber will be considerably greater than the surface area per unit length enclosed by layer 12 in the finished three-layer fiber prepared from the preform of FIG. 1. As a result, the four-layer fiber can have greater surface compression, with resultant improvement in fiber tensile strength, durability, and fiber life.

Except for the deposition of a suitable glassy material for the high-expansion layer 14, e.g., a germania silicate glass, the method of preparing the partially-completed preform of FIG. 2 may be the same as for the partially-completed preform of FIG. 1. The VYCOR or equivalent substrate layer 13 may be the same and the method of preferentially etching away the layer 13 may be the same. It will also be apparent that the principles of my invention can be equally well applied to other similar types of multilayer structures in which the initial substrate material is to be removed.

In order to shorten the etching time, when finishing either the preform of FIG. 1 or the preform of FIG. 2, a substantial portion of the excess substrate material may first be removed by mechanical grinding or laser milling, as taught in the referenced Kao et al. application; but this step is not essential to the practice of my invention.

The final etching step may readily be controlled with precision by regulating the etchant concentration, temperature and immersion time. The etchant is also preferably stirred magnetically by known techniques to achieve a uniform etch. The etching time is adjusted in relation to the thickness of the substrate layer so that all of the substrate layer is removed, leaving only the high-compression layer 12 as the outer layer of the finished preform. Details of the etching process are well-known to the art and need no further elaboration here. Since the softer substrate glass is etched away much faster than the underlying layer, the etching process can readily be stopped, with a reasonable time tolerance, before the thin layer 12 is damaged.

By way of example, Table I below summarizes some glass compositions that may suitably be used in practicing the preferential etching process of my invention, together with brief comments on the desired physical characteristics of each glass:

TABLE I

| Layer No. (FIG. 1 or 2) | Illustrative Glass Compositions | Relative Physical Characteristics |
|---|---|---|
| 10 | 20% germania silicate glass (optionally with traces of boron or phosphorous). | Suitable IR[1] for optical fiber core. Rel. high CTE[2] Rel. low $T_g$[3] |
| 11 | 4% borosilicate glass (or optionally a mixt. of 40% germania silicate & 15% borosilicate glass). | Suitable IR for optical cladding. Rel. high CTE. Rel. low $T_g$. |
| 14 (in FIG. 2 only) | 40% germania silicate glass (or opt. mixtures of germanium & boron silicate glasses). | Rel. high CTE Rel. low $T_g$. |
| 12 | Pure fused silica glass ($SiO_2$). | Rel. low CTE. Rel. high $T_g$. Rel. low etch. rate |
| 13 | VYCOR glass or equiv. | Rel. high etch. rate in HF acid. |

Key to Abbreviations
[1] IR Optical index of refraction.
[2] CTE Coefficient of thermal expansion.
[3] $T_g$ Glass transition temperature.

As previously stated, the precise dimensions of the core and various layers may vary considerably, depending on the type of service for which the finished fiber is designed and whether designed for single-mode or multi-mode signal transmission. Purely by way of illustration, Table II below gives some exemplary dimensions of finished multimode fibers which may be drawn from the completed preforms made from the structures of FIGS. 1 and 2. Note that in each case the high-compression outer layer is shown as having a nearly optimum thickness of 2 to 3 microns, as is feasible in the practice of my invention:

TABLE II

| Fiber Layer | From Preform Layer | Thickness in microns | Cumulative Diameter in microns |
|---|---|---|---|
| A. Finished Three-Layer Fiber (From Fig. 1) | | | |
| Core | 10 | 50 (Diam.) | 50 |
| Cladding | 11 | 15 | 80 |
| H-C outer layer | 12 | 2–3 | 84–86 |
| B. Finished Four-Layer Fiber (From Fig. 2) | | | |
| Core | 10 | 50 (Diam.) | 50 |
| Cladding | 11 | 15 | 80 |
| H-E layer | 14 | 30 | 140 |
| H-C outer layer | 12 | 2–3 | 144–146 |

It will thus be apparent that the proper selection of materials for the layers 12 and 13 and the preferential etching technique of my invention provides several advantages over prior art techniques described herein. Among such advantages are these:

(1) While it is desirable that the initial tubular substrate have a precision bore, extreme accuracy in its wall thickness is not required.

(2) Any preliminary grinding or other physical removal of excess substrate material is not critical since it need not be removed down to the thin high-compression layer that is to remain.

(3) With preferential etching there is no danger that the etchant will penetrate and damage the thin high-compression layer.

(4) In the event that the partially-completed preform is slightly out-of-round, due for example to a non-uniform collapse, the preferential etching method of my invention can still be used to produce a high-strength preform and resultant optical fiber having an outer compression layer of uniform thickness.

While I have disclosed certain exemplary materials and specific process steps for producing preforms and fibers of high tensile strengths, it will be apparent to those skilled in the art that other equivalents and alternative techniques may be employed without departing from the scope of my invention as set forth in the appended claims.

I claim:

1. A method of fabricating a multilayer optical glass preform having a relatively thin outer compression layer of fused silica comprising the steps of:

depositing by chemical vapor deposition within a hollow tubular substrate tube composed of a sodium borosilicate glass, in the order named,
 (a) said relatively thin compression layer of fused silica,
 (b) at least one relatively thick cladding layer of doped silica glass having a relatively high coefficient to thermal expansion and a lower glass transition temperature than those of said compression layer, and
 (c) a doped silicate glass core layer having a lower index of optical refraction than that of the adjacent cladding layer;

collapsing said substrate tube and enclosed layers under heat to form a solid composite preform rod;

immersing said rod in an etchant solution which dissolves said substrate glass at a rate much faster than the rate at which it dissolves said compression layer of fused silica; and maintaining said rod in said etchant solution for a time interval just sufficient to dissolve said substrate glass completely without substantially dissolving said compression layer of fused silica.

2. The method of claim 1 wherein said etchant solution is a solution of hydrofluoric acid.

3. The method of claim 2 wherein said substrate tube is a sodium-borosilicate glass consisting of 96 to 97% silica and a 3 to 4% mixture of boron oxide and sodium oxide.

* * * * *